UNITED STATES PATENT OFFICE 2,238,215

CHROMABLE TRIARYL-METHANE DYES

Wilhelm Eckert, Karl Schilling, and Paul Hofmann, Frankfort-on-the-Main, Germany, assignors to General Aniline & Film Corporation, a corporation of Delaware No Drawing. Application December 23, 1938, Serial No. 247,408. In Germany December 24, 1937

8 Claims. (Cl. 260—335)

The present invention relates to a process of preparing dyestuffs capable of being chromed of the triaryl-methane series and to the dyestuffs thus obtained.

We have found that very clear and fast dyestuffs capable of being chromed are obtained by condensing a 5-halogen-trimellitic acid of the following formula

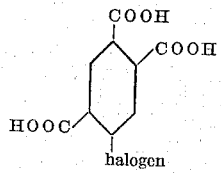

for instance, the 5-chloro- or 5-bromo-trimellitic acid or the anhydride thereof, with an aromatic hydroxyl compound having in meta-position to the hydroxyl-group a substituted amino-group or a second hydroxyl-group, or an alkoxy-group and having a reactive nuclear hydrogen atom in para position to the said substituted amino-group, or second hydroxyl-group, or alkoxy-group then exchanging the halogen atom for any radical and, if desired, halogenating the dyestuff thus obtained.

The 5-halogen-trimellitic acid used as starting material may be prepared, for instance, by chlorinating or brominating pseudo-cumene and subsequently oxidising the product obtained by means of potassium permanganate.

As aromatic hydroxyl-compounds there may be used, for instance, those of the following general formula

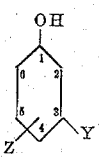

wherein the 6-position is unsubstituted and wherein Y stands for a hydroxyl- or an alkoxy-group or a substituted amino-group and Z means hydrogen or a substituent as, for instance, halogen, methyl, hydroxyl, carboxyl, sulfo or nitro. As substituted amino-groups in these compounds there come into consideration, for instance, the following: $NH.C_6H_5$, $NH.C_6H_3(CH_3)_2$,

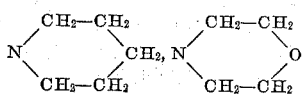

(cp. Examples 5 and 14 of application Ser. No. 127,312), $N(C_2H_5)_2$, $N(CH_3)_2$, $N(propyl)_2$, $N(butyl)_2$, $NH.CH_3$, $NH.C_2H_5$, $N(C_2H_4OH)_2$,

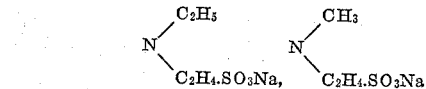

$N(C_2H_4.SO_3Na)_2$.

The following compounds are suitable for exchanging the halogen atom: for instance, ammonia, alkyl-, aryl- and aralkyl-amines and substitution products thereof; alkyltaurines, arylsulfamides; further, amino-salicylic acid and the like; hydrolising agents may also be used.

The dyestuffs thus obtained dye animal fiber, in an acid bath, very clear orange, yellow to bluish-red and violet shades. The properties of fastness are essentially enhanced by after-chroming the dyeings, and are then very good. The dyestuffs are also suitable for chrome-printing on cotton, artificial silk and the like and may be chromed in substance, the corresponding chromium complex salts being then formed. These salts dye the fiber, in an acid bath, very clear tints which, without after-chroming, have very good properties of fastness.

The following examples serve to illustrate the invention, but they are not intended to limit it thereto; the parts are by weight:

1. 30 parts of diethylamino-meta-phenol and 60 parts of 5-bromo-trimellitic acid anhydride are stirred together, for two hours, at a temperature of 170° C. to 180° C. The melt is introduced into a sodium carbonate solution, whereby it dissolves; the solution is then rendered acid to litmus paper by means of dilute acetic acid; the dyestuff separates in the form of the free acid whereas the excess of the 5-bromo-trimellitic acid used remains in the solution. The dyestuff acid is filtered with suction, washed with water and dried; it is a red powder and dyes animal fiber, in an acid bath, clear red tints.

2. 7 parts of dimethylamino-meta-phenol and 11 parts of 5-chloro-trimellitic acid anhydride are mixed and heated, for 5 hours, at 170° C. to 180° C. After cooling, the melt is pulverized and stirred, while cold, with hydrochloric acid of 40 per cent strength; the dyestuff dissolves and the excess of 5-chloro-trimellitic acid remains. After filtering, the dyestuff is precipitated from the filtrate by addition of water.

3. 5.8 parts of the product described in Example 1 are dissolved in 300 parts of water and neutralized by means of sodium carbonate; the solution is then heated, for 5 hours, at about 150° C., some copper powder and cuprous chloride and 15 parts of piperidine being added. The copper and the cuprous chloride are removed by filtration and the solution is then evaporated to dryness in order to remove the excess of the piperidine; it is then taken up in water, and dilute hydrochloric acid is added until the reaction to Congo paper is acid. The dyestuff which thereby separates may, if desired, again be purified by dissolving it in sodium carbonate and reprecipitating it by means of hydrochloric acid or by dissolving it in cold hydrochloric acid of 40 per cent strength and reprecipitating it by means of water. The dyestuff thus obtained dyes animal fiber, in an acid bath, a very clear bluish-red tint. By after-chroming, the shade becomes somewhat more bluish and the properties of fastness, such as the fastness to washing, to perspiration, to sea-water and to fulling, are essentially improved. The dyestuff is also very suitable for chrome-printing on cotton and artificial silk.

4. 28 parts of ethylamino-meta-phenol and 82 parts of 5-bromo-trimellitic acid anhydride are melted together at 170° C. to 180° C. and this temperature is kept for about 3 hours. After working up the fused mass as indicated in Example 1, 32 parts of the dyestuff are obtained; it dissolves in cold hydrochloric acid of 40 per cent strength to a yellow-red solution and may be precipitated by addition of water. The dyestuff is a red powder and dyes animal fiber, in an acid bath, red tints.

5. 5.3 parts of the product obtained according to the process of Example 4 are dissolved in about 300 parts of water and neutralized by means of sodium carbonate; the solution is then treated, for some hours, at 140° C. to 155° C. with some copper powder and cuprous chloride and, furthermore, 15 parts of piperidine. The dyestuff formed is worked up as indicated in Example 3; it dyes animal fiber, in an acid bath, a very clear yellowish-red tint. On after-chroming, the shade becomes somewhat more red and the general properties of fastness are essentially improved.

6. 36 parts of 3'-hydroxy-phenyl-piperidine (obtainable by causing resorcinol to react, at about 150° C., with piperidine and 82 parts of 5-bromo-trimellitic acid anhydride are heated, while stirring, for some hours at 170° C. to 180° C. The dyestuff is isolated as indicated in Example 1; the yield amounts to 43 parts.

7. When using in Example 6, instead of 5-bromo-trimellitic acid anhydride, the equivalent amount of 5-chloro-trimellitic acid anhydride, there is obtained, after working up in the manner above indicated, a dyestuff having properties similar to those of the product obtained by the process of Example 6.

8. 6.05 parts of the dyestuff obtained by the process of Example 7 are dissolved in water and neutralized by means of sodium carbonate; the solution is then heated, for some hours, with aqueous piperidine of about 5 per cent strength, at 145° C. to 150° C., 1 part of copper powder and 1 part of cuprous chloride being added. The dyestuff formed is isolated as indicated in Example 3; it dyes animal fiber, in an acid bath, a vivid bluish-red tint. By after-chroming, the essential properties of fastness are distinctly improved.

9. 22 parts of resorcinol, 59.8 parts of 5-bromo-trimellitic acid and 20 parts of zinc chloride are melted together and the mass is heated, for 4 hours, while stirring, at 180° C. After cooling and pulverizing, the mass is freed from the zinc chloride by treating it with water. The residue is dissolved in dilute ammonia, filtered and the dyestuff is precipitated by addition of hydrochloric acid. It is a brown powder the alkali salt of which dissolves in water to a solution having an intense greenish fluorescence and dyes animal fiber, in an acid bath, yellow tints.

10. 5 parts of the product described in Example 9 are dissolved in 400 parts of water, sodium carbonate being added; the solution is then heated, for about 5 hours, together with 20 parts of piperidine, 1 part of cuprous chloride and 1 part of copper powder, at 145° C. to 155° C., until the reaction is complete. After filtering, the solution is evaporated to dryness; the residue is redissolved in water and the solution is rendered acid to litmus paper by means of dilute hydrochloric acid; the dyestuff separates. It may be purified, if desired, by dissolving it in caustic soda solution and reprecipitating it by means of hydrochloric acid.

3.4 parts of this dyestuff are dissolved in 50 parts of methanol, and 6 parts of bromide are added thereto, drop by drop, at ordinary temperature, until a test portion, when dissolved in water, imparts a blue colouration to potassium iodide starch paper. The solution of the dyestuff in methanol is treated with steam, in order to remove the methanol; the insoluble dyestuff remains. It may, if desired, be dissolved in caustic soda solution and then be reprecipitated by means of hydrochloric acid. The dyestuff is a red powder the alkali salts of which dissolve in water to a bright red solution having an intense fluorescence. It dyes animal fiber, in an acid bath, a clear yellowish red tint. On after-chroming, the dyeing becomes somewhat bluer and its general properties of fastness are essentially improved. The dyestuff is also very suitable for chrome printing on cotton and artificial silk.

11. If there is used in the process of Example 9, instead of the 5-bromo-trimellitic acid, the corresponding amount of the 5-chloro-trimellitic acid, a dyestuff having similar properties is obtained which may be treated in the manner described in Example 10.

12. 5.5 parts of 5-chloro-trimellitic acid anhydride, 7 parts of 4-chloro-resorcinol and 3 parts of zinc chloride are melted together, for about 3 hours at 180° C. After cooling, the mass is extracted by means of water, the residue is dissolved in dilute ammonia and the dyestuff formed is precipitated by means of dilute hydrochloric acid. It is a brown-red powder the alkali salts of which dissolve in water to a solution having an intense greenish fluorescence. It dyes animal fiber, in an acid bath, orange tints.

13. 4 parts of the dyestuff obtained by the process of Example 12 are dissolved in 400 parts of water, while adding sodium carbonate, and the solution is then treated as indicated in Example 10. The dyestuff obtained dyes animal fiber, in an acid bath, a yellowish-orange tint. By after-chroming, the properties of fastness of the dyeing are improved.

14. 26 parts of ethyl-beta-sulfethyl-amino-meta-phenol (obtainable, for instance, by causing meta-ethyl-aminophenol to react in water with sodium beta-chlorethanesulfonate), 82 parts of 5-bromo-trimellitic acid anhydride and 15 parts of zinc chloride are together heated, while stirring, for some hours, for instance 4 hours, at 225° C. After cooling, the mass is finely pulverized and stirred, while cold, with several successive lots of 200 parts of ethyl alcohol; the pure dyestuff then remains.

15. 7.8 parts of the dyestuff obtained by the process described in Example 14 are heated, for several hours, for instance for 5 hours, in an autoclave together with aqueous piperidine of about 5 per cent. strength at 145° C. to 150° C., one part of cuprous chloride and one part of copper powder being added. After filtering, the solution is evaporated and dried at 100° C. under reduced pressure. The dyestuff thus obtained is a red powder, dissolves easily in water and dyes animal fiber, in an acid bath, a yellow-red tint. On after-chroming, the shade becomes somewhat more reddish; the properties of fastness are very good.

16. 7 parts of methyl-beta-sulfethylamino-meta-phenol (obtainable, for instance, by causing methylamino-meta-phenol to react, in an aqueous solution, with sodium beta-chlorethane-sulfonate) and 11 parts of 5-chloro-trimellitic acid anhydride are melted together, for 3 hours, at 210° C. After cooling, the mass is finely pulverized and stirred, while cold, with several successive lots of 50 parts of ethanol; the pure dyestuff then remains. It easily dissolves in water to a red solution and dyes animal fiber, in an acid bath, bordeaux tints.

17. 7.5 parts of 3-ethylamino-4-methylphenol and 11 parts of 5-chloro-trimellitic acid anhydride are heated, while stirring, at 170° C. to 180° C. for 6 hours. After cooling, the mass is pulverized and stirred with cold hydrochloric acid of 40 per cent strength, whereby the dyestuff is dissolved. After filtering with suction, the dyestuff is precipitated from the filtrate by addition of water. The yield amounts to 8.9 parts.

18. When treating the product obtained by the process of Example 17 with aqueous piperidine of 5 per cent strength, as indicated in the foregoing examples, there is obtained, after working up correspondingly, a red dyestuff which dyes animal fiber red tints. By after-chroming, the properties of fastness are improved.

19. 10 parts of the dyestuff obtainable according to Example 1 are dissolved in 300 parts of water while adding sodium carbonate, and after addition of 5 parts of diethylamine the whole is heated at 150° C. for 5 hours in an autoclave of copper. After filtering, the dissolved dyestuff is precipitated in the form of a red powder by adding acetic acid; the red powder is filtered with suction and washed with water until the filtrate does no longer show the reaction of acetic acid. The new dyestuff may, if desired, be purified by dissolving it in dilute caustic soda solution and precipitating by means of dilute acetic acid or by dissolving it in hydrochloric acid of 20 to 36 per cent strength and precipitating it by addition of water to the hydrochloric acid solution of the dyestuff. The dyestuff is transformed into the sodium salt. It dyes the animal fiber from an acid bath brilliant red tints, which, when after-chromed, turn to blue and possess very good fastness properties.

20. 10 parts of the dyestuff obtainable according to Example 1, 50 parts of diethylamine, 1 part of cuprous chloride and 1 part of copper powder are together heated for 5 hours at 150° C. After filtering, the solution is evaporated to dryness on the steam bath, the residue is treated with 500 parts of hot water, whereby the new dyestuff dissolves. After filtering with suction the filtrate is rendered acid by means of dilute hydrochloric acid, whereby the dyestuff is precipitated.

The dyestuff is filtered with suction, washed until neutral and transformed into the sodium salt. With regard to its tinctorial properties the dyestuff behaves in a similar manner than that of the preceding example.

21. 11.6 parts of the dyestuff obtainable according to Example 1 are dissolved in 500 parts of water while adding 10 parts of sodium carbonate and after addition of 0.1 part of cuprous iodide the whole is heated for 5 hours at 150° C. The dyestuff is worked up as described in Example 19.

The dyestuff dyes animal fiber brilliant red tints, which, when after-chromed, become somewhat bluer, the fasteness properties, the fastness to light inclusively, being essentially enhanced and being very good.

22. 5.25 parts of the dyestuff obtainable according to Example 4 are dissolved in 200 parts of water while adding 3 parts of sodium carbonate. After addition of 1.4 parts of anthranilic acid the whole is heated for 5 hours at 150° C. in an autoclave of copper. The soluton of the dyestuff is mixed with dilute acetic acid, while hot, whereby the dyestuff precipitates in the form of a red powder. After filtering with suction and washing the dry residue amounts to 4.45 parts. It dyes from an acid bath animal fibers red tints, which on after-chroming become somewhat browner, the essential properties being distinctly enhanced.

We claim:

1. The process which comprises condensing a compound of the group consisting of compounds of the formulae

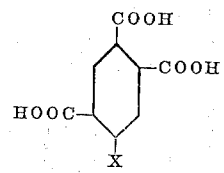

and

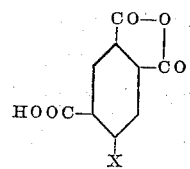

wherein X means a halogen atom of the group consisting of chlorine and bromine, with a compound of the formula

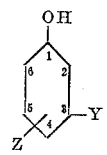

wherein Y represents a member of the group consisting of substituted amino-groups, hydroxyl and alkoxyl, Z represents a member of the group consisting of hydrogen, halogen, methyl, hydroxyl, carboxyl, sulfonic and nitro and wherein the 6-position is unsubstituted, the condensation being effected by heating the reagents, and heating the condensation product obtained with a compound of the group consisting of ammonia, amines and hydrolyzing agents.

2. The process which comprises melting at substantially 180° C. for substantially 4 hours 5-bromo-trimellitic acid with resorcin in the presence of zinc chloride, heating at substantially 145° C. to 155° C. for substantially 5 hours in a closed pressure vessel the purified condensation product in the form of its sodium salt with piperidine in the presence of water, copper powder and cuprous chloride and brominating the product obtained.

3. The process which comprises melting at substantially 225° C. for some hours 5-bromo-trimellitic acid anhydride with N-(ethyl-beta-sulfoethyl)-meta-aminophenol in the presence of zinc chloride and heating at about 145° C. to 150° C. for substantially 5 hours in a closed pressure vessel the purified condensation product in the form of its sodium salt with piperidine in the presence of water, copper powder and cuprous chloride.

4. The process which comprises melting at substantially 170° C. to 180° C. for 2 hours 5-bromo-trimellitic acid anhydride with meta-diethylaminophenol and heating at substantially 150° C. for substantially 5 hours in a closed pressure vessel of copper the purified condensation product in the form of its sodium salt with diethylamine in the presence of water.

5. The compounds obtained by the process which comprises condensing a compound of the group consisting of compounds of the formulae

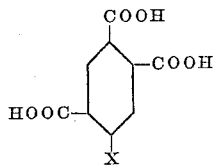

and

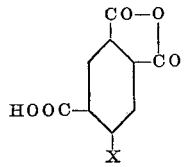

wherein X means a halogen atom of the group consisting of chlorine and bromine, with a compound of the formula

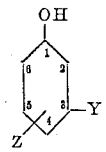

wherein Y represents a member of the group consisting of substituted amino-groups, hydroxyl and alkoxyl, Z represents a member of the group consisting of hydrogen, halogen, methyl, hydroxyl, carboxyl, sulfonic and nitro and wherein the 6-position is unsubstituted, the condensation being effected by heating the reagents, and heating the condensation product obtained with a compound of the group consisting of ammonia and amines.

6. The compound obtained by the process which comprises melting at substantially 180° C. for substantially 4 hours 5-bromo-trimellitic acid with resorcin in the presence of zinc chloride, heating at substantially 145° C. to 155° C. for substantially 5 hours in a closed pressure vessel the purified condensation product in the form of its sodium salt with piperidine in the presence of water, copper powder and cuprous chloride and brominating the product obtained.

7. The compound obtained by the process which comprises melting at substantially 225° C. for some hours 5-bromo-trimellitic acid anhydride with N-(ethyl-beta-sulfoethyl)-meta-aminophenol in the presence of zinc chloride and heating at substantially 145° C. to 150° C. for substantially 5 hours in a closed pressure vessel the purified condensation product in the form of its sodium salt with piperidine in the presence of water, copper powder and cuprous chloride.

8. The compound obtained by the process which comprises melting at substantially 170° C. to 180° C. for 2 hours 5-bromo-trimellitic acid anhydride with meta-diethylaminophenol and heating at substantially 150° C. for substantially 5 hours in a closed pressure vessel of copper the purified condensation product in the form of its sodium salt with diethylamine in the presence of water.

WILHELM ECKERT.
KARL SCHILLING.
PAUL HOFMANN.